(12) United States Patent
Toda et al.

(10) Patent No.: US 6,357,898 B1
(45) Date of Patent: Mar. 19, 2002

(54) AUTOMATIC AUTOMOBILE HEADLAMP LEVELING DEVICE

(75) Inventors: Atsushi Toda; Hideaki Takeuchi, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/502,651

(22) Filed: Feb. 11, 2000

(30) Foreign Application Priority Data

Feb. 17, 1999 (JP) .......................................... 11-038233

(51) Int. Cl.[7] ................................................. B60Q 1/06
(52) U.S. Cl. ....................... 362/466; 362/464; 362/465; 362/467
(58) Field of Search ................................. 362/464, 465, 362/466, 467

(56) References Cited

U.S. PATENT DOCUMENTS 5,877,680 A * 3/1999 Okuchi et al. .............. 362/464
5,907,196 A    5/1999 Hayami et al.

FOREIGN PATENT DOCUMENTS

EP    0 847 895 A2    6/1998
GB    2 342 149 A     4/2000

* cited by examiner

*Primary Examiner*—Stephen Husar
*Assistant Examiner*—Guy Lee
(74) *Attorney, Agent, or Firm*—Fish & Richardson P.C.

(57) ABSTRACT

An automatic headlamp leveling device is provided to reduce headlamp leveling from occurring during inappropriate times. Wherefore, an automatic automobile headlamp leveling device includes headlamps, each adapted to be driven by an actuator such that a light axis thereof is tilted up and/or down relative to a vehicle body, a control section for controlling the driving of the actuators according to various received vehicle conditions, a vehicle speed sensor, a pitch angle sensor, and a storage section for storing pitch angle data detected by the pitch angle sensor, the control section controlling the driving of the actuators based on the pitch angle data so detected such that the light axes of the headlamps always stay in a certain tilted state relative to the surface of a road, wherein the control section controls the driving of the actuators at certain intervals when the vehicle is at a stop, and when the vehicle is running, the control section controls the driving of the actuators only once, and wherein the control section judges it as an inappropriate leveling state when pitch angle data continues to be detected which differs from pitch angle data detected when the vehicle is at a stop by a predetermined value, so that headlamp leveling does not occur during vehicle turning and slaloming.

10 Claims, 7 Drawing Sheets

AUTOMATIC AUTOMOBILE HEADLAMP LEVELING DEVICE

BACKGROUND OF THE INVENTION

The present invention relates to an automatic automobile headlamp leveling device for automatically adjusting the tilt of headlamps of a vehicle based on a tilt of the vehicle in a longitudinal direction thereof (hereinafter, referred to as a pitch angle) in a direction in which the light axes of the headlamps are adjusted so as to offset the tilt of the vehicle (hereinafter, referred to as automatic leveling).

A headlamp of this kind is constructed, for instance, such that a reflector having a light source securely inserted thereinto is supported in such a manner as to be tilted about a horizontal tilting shaft relative to a lamp body and that the light axis of the reflector (headlamp) is tilted by an actuator about the horizontal tilting shaft.

A conventional automatic headlamp leveling device comprises a pitch angle detection means, a vehicle speed sensor and a control section for controlling the driving of actuators based on detection signals from the detection means and sensor, which are mounted on a vehicle for adjusting light axes of the headlamps (reflectors) of the vehicle such that the light axes stay in a certain state relative to the surface of a road at all times.

The conventional automatic headlamp leveling device is, however, constructed such that the leveling of headlamps of a vehicle is performed in real time, whether the vehicle is moving or not, in response to changes in vehicle posture, resulting when the vehicle is accelerated or decelerated while running, or changes in load, resulting from luggage being loaded and unloaded, or when occupants get in or out of the vehicle. Due to the frequency of these potential changes, the number of times when the actuator is activated is highly increased, power consumption is increased, and a high durability is required for driving mechanism constituent components such as motors, gears and the like. All of these factors result in high productions costs.

To cope with this problem, an automatic headlamp leveling device (JP-A-10-264221) was proposed with a view to providing an automatic headlamp leveling device that is inexpensive and which has a long service life by reducing the frequency at which the actuators are driven. The proposed automatic headlamp leveling device being constructed such that the driving of actuators is controlled at certain intervals while the vehicle is stopped. While the vehicle is running, the driving of the actuators is controlled only once, provided the vehicle is running in a stable fashion in which certain speed and acceleration continues for a predetermined length of time.

A drawback with the proposed automatic headlamp leveling device is that the vehicle height sensor, which is the pitch angle detection means, may detect a change in pitch angle when the vehicle is turning or slaloming, and the control section judges such a state as a stable running, whereby appropriate automatic headlamp leveling cannot be carried out. This problem will be described below referring to FIGS. 7 and 8 showing output characteristics of vehicle speeds and vehicle postures after the vehicle starts to run. FIG. 7 shows a case in which the vehicle turns while running at a constant speed, and FIG. 8 shows a case in which the vehicle slaloms while running at a constant speed.

FIG. 7, is a case where the vehicle height sensor, acting as the pitch angle detection means, is mounted on, for instance, the rear right-hand side of the vehicle suspension. Here, when the vehicle turns left while running at a constant speed, the right-hand side of the suspension dives (contracts) due to an acceleration of gravity when turning, and the vehicle height sensor, mounted on the suspension, detects this dive as a tilt of the vehicle in a longitudinal direction thereof (i.e., a change in pitch angle of the vehicle) (refer to a characteristic A' in FIG. 7). Due to this, the automatic headlamp leveling device (the control section) judges that stable running conditions are met if the pitch angle data θ, detected by the vehicle height sensor, continues for a predetermined length of time (refer to reference character t1 in FIG. 7), and performs a leveling (controlling) of the light axes of the headlamps in a downward direction. This reduces a visible distance in front of the vehicle, which is undesirable from the safe driving point of view.

On the contrary, when the vehicle turns right, the vehicle height sensor mounted on the rear left-hand side suspension floats (extends), as shown by a characteristic B' in FIG. 7. If this state continues for a predetermined length of time, the automatic headlamp leveling device (the control section) performs a leveling (controlling) of the light axes of the headlamps in an upward direction. This generates glaring light, which is undesirable to an oncoming vehicle.

In addition, when the vehicle slaloms, as shown in FIG. 8, the rear left-hand side suspension on which the vehicle height sensor is mounted dives and floats (contracts and extends). In such a vehicle running state, the vehicle height sensor also detects tilts in the longitudinal direction of the vehicle (changes in pitch angle), and if this state continues over the predetermined length of time, the automatic headlamp leveling device (the control section) performs erroneous light axes leveling, which is also undesirable.

SUMMARY OF THE INVENTION

The present invention was made in view of the aforesaid problems inherent in the prior art, and an object thereof is to provide an automatic automobile headlamp leveling device that is inexpensive and which has a long service life by reducing the frequency at which actuators are driven to thereby improve the improper automatic headlamp leveling when a vehicle is running.

With a view to attaining the aforesaid object, a first embodiment of the invention provides an automatic automobile headlamp leveling device comprising headlamps adapted to be driven by an actuator such that a light axis thereof is tilted up and/or down relative to a vehicle body, control means for controlling the driving of the actuators, vehicle speed detection means for detecting the speed of a vehicle, pitch angle detection means for detecting a pitch angle of the vehicle, and a storage section for storing pitch angle data of the vehicle detected by the pitch angle detection means, the control means controlling the driving of the actuators based on pitch angle data detected by the pitch angle detection means such that the light axes of the headlamps always stay in a certain tilted state relative to the surface of a road, wherein the control means judges whether the vehicle is at a stop or is running based on outputs from the vehicle speed sensors and then controls the driving of the actuators at certain intervals when the vehicle is at a stop, and while the vehicle is running, it controls the driving of said actuators only once during a stable running. The automatic automobile headlamp leveling device being characterized in that the control means judges as an inappropriate leveling state a state in which a pitch angle is continuously detected while the vehicle is running which differs from pitch angle data taken when the vehicle is at a stop by a predetermined value or greater and then stops controlling the driving of the actuators.

The inappropriate leveling states are referred to, respectively, as a vehicle turning state, in which pitch angle data is greater (or smaller), by a predetermined value, than pitch angle data taken when the vehicle is at a stop, is detected continuously for a predetermined length of time or longer, and a vehicle slaloming state, in which pitch angle data is greater and smaller, by a predetermined value, than pitch angle data taken when the vehicle is at a stop is detected alternately.

In this invention, it is premised that the leveling (light axis correction) is carried out based on pitch angle data taken when the vehicle is at a stop. Pitch angle data taken when the vehicle is at a stop is more accurate than when taken as the vehicle is running to the extent that the former is affected by disturbance factors less than the later. Since the driving of the actuators is controlled based on the accurate pitch angle data, a more accurate automatic headlamp leveling becomes possible.

In addition, since the controlling of the driving of the actuators when the vehicle is at a stop is so limited that they are controlled every time a predetermined length of time elapses, the frequency at which the actuators are activated is reduced, whereby power can be saved and the wear of the driving mechanism constituent members is limited.

Furthermore, the leveling (light axis correction) based on pitch angle data when the vehicle is running corrects the result of a leveling carried out based on pitch angle data taken when the vehicle is at a stop in an inappropriate condition such as one where the vehicle is parked on an inclined road or the vehicle is parked on a curb.

Moreover, the control means judges on an inappropriate leveling state (a turning state and a slaloming state) that is easily taken for a stable running state based on pitch angle data detected while the vehicle is running and stops a leveling during such an inappropriate leveling state, and therefore erroneous automatic headlamp leveling can be avoided.

An invention according to a second preferred embodiment provides an automatic automobile headlamp leveling device as described by the first embodiment, wherein the control means controls the driving of the actuators to level the headlamps based on pitch angle data taken when the vehicle is determined to be running in a stable fashion, after the control means had previously made a judgement of an inappropriate leveling state and stopped controlling the driving of the actuators.

Accordingly, when the running state of the vehicle changes from the inappropriate leveling state to the appropriate stable running state, if no control of the driving of the actuators has been carried out while running, the control section controls the driving of the actuators without any delay for appropriate automatic headlamp leveling.

Another embodiment of the invention provides an automatic automobile headlamp leveling device wherein controlling of the actuators is performed only when the headlamps are turned on.

Since the actuators are not activated if no headlamps are turned off, the number of times when the actuators are operated can be reduced, power can be saved, and the wear of the driving mechanism constituent members is limited to such an extent.

Additionally, an automatic automobile headlamp leveling device can be provided wherein the actuator driving intervals are set to be longer than a maximum driving time of the actuator required for each leveling operation.

If an interval between a previous control and a following control is shorter than the maximum driving time of the actuator, the actuator is caused to start the next operation before a target value is reached. This increases the frequency at which the actuator is driven, leading to a reduction of the service life of the actuator. With this construction, however, after is assuredly reaches the target value in the previous control, the actuator is driven to the following control. This reduces the frequency at which the actuator is driven, whereby the service life of the actuator is increased to the extent that the actuator driving frequency is so reduced.

In addition, by extending the interval at which the actuator is driven, a change in pitch angle data within the interval between the previous control to the following control can be omitted without driving the actuator. In other words, every action happening within the interval can be concentrated on the driving of the actuator in the following control, and therefore, the frequency at which the actuator is driven can also be reduced.

Moreover, pitch angle data of the vehicle detected by the pitch angle detection means are at all times taken into the control section for calculation, even during the actuator driving interval. Furthermore, by utilizing all of the pitch angle data taken into the control section as control data, numerous pitch angles can be used as control data, thereby making it possible to perform an appropriate leveling of the headlamps entailed by a detection of accurate vehicle posture (pitch angle).

DETAILED DESCRIPTION OF THE DRAWINGS

These and other advantages of the present invention will now be described with reference to the accompanying drawings.

Figure 1:
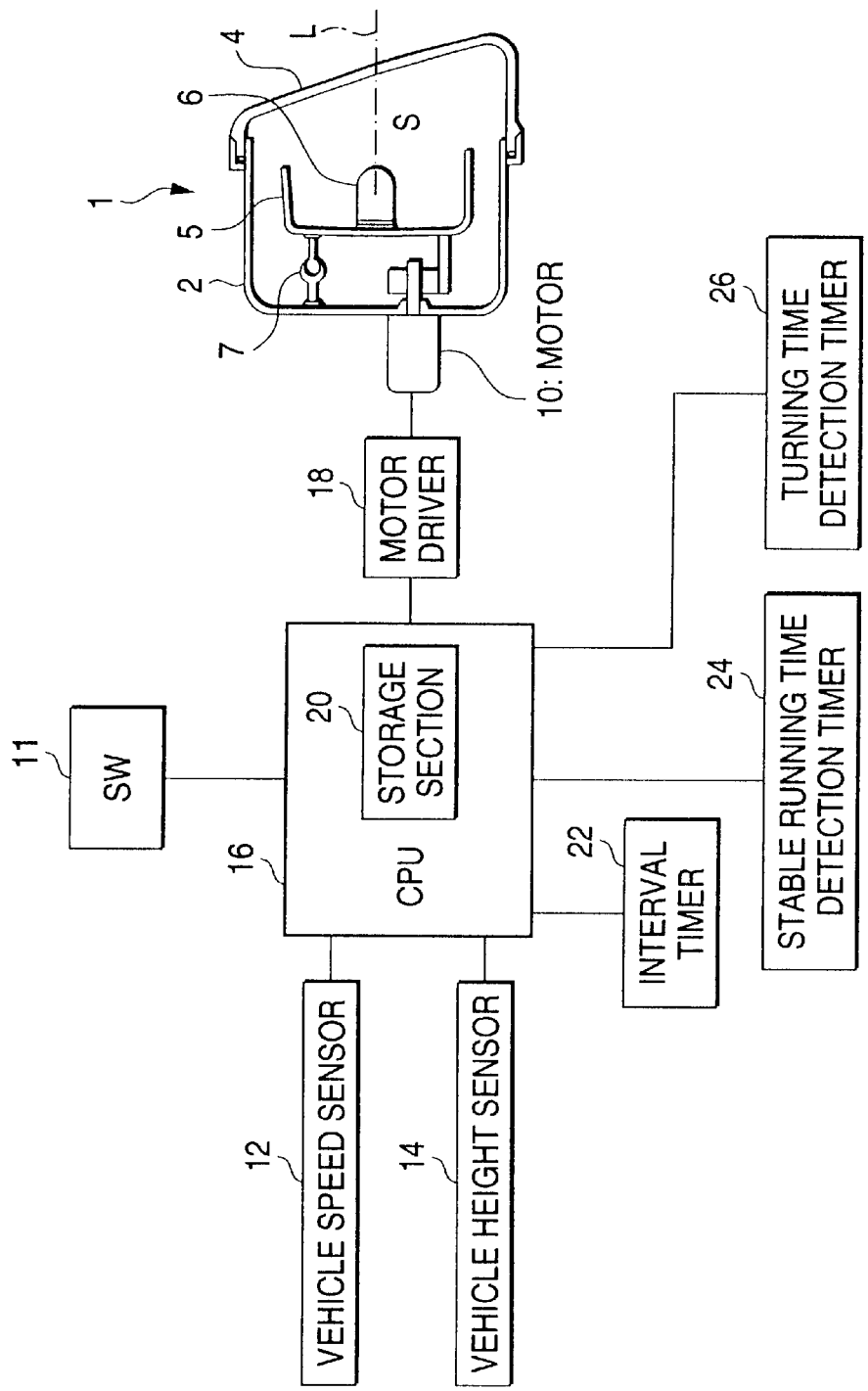
FIG. 1 illustrates a diagram showing the overall construction of an automatic automobile headlamp leveling device according to a first embodiment of the present invention.
Figure 2:
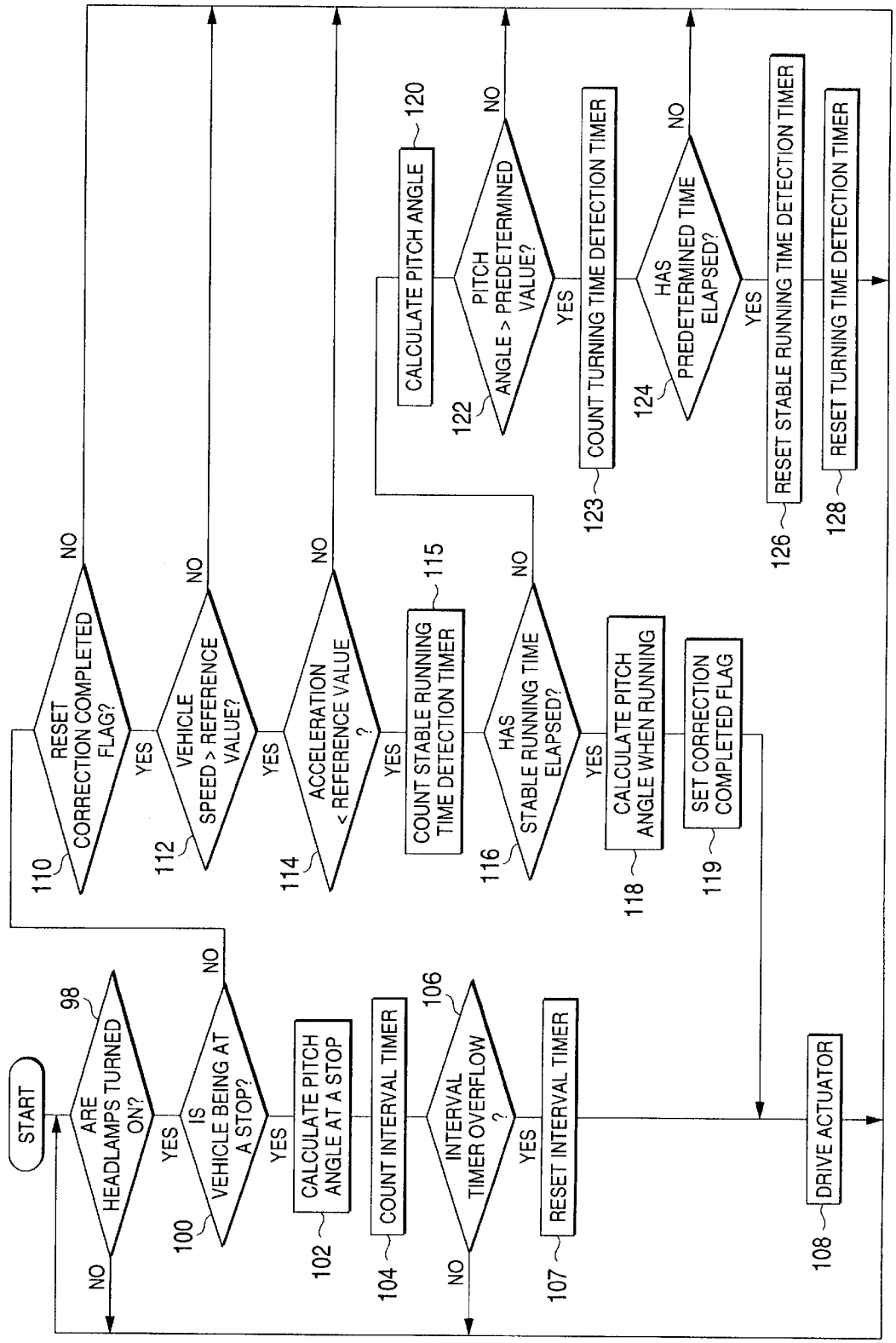
FIG. 2 illustrates a flowchart of a CPU which is a control section of the first embodiment.
Figure 3:
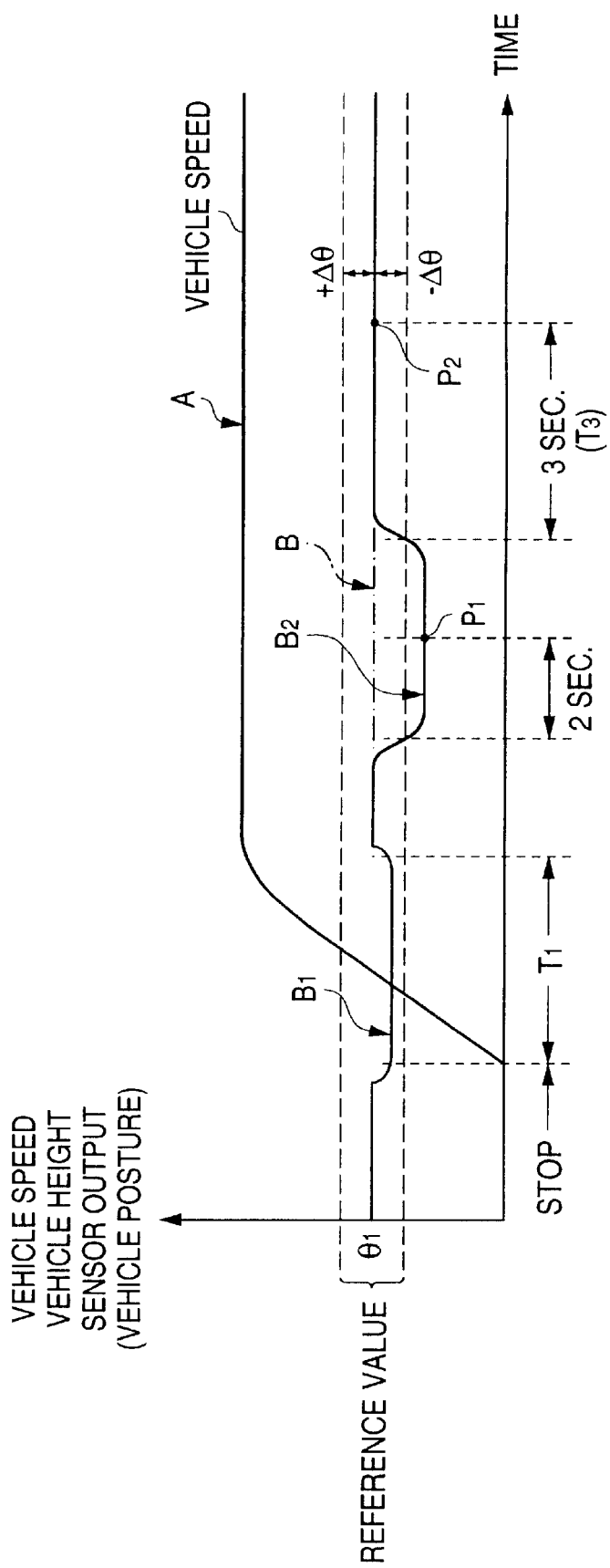
FIG. 3 illustrates changes in vehicle speed and vehicle posture after the vehicle has started to run.

FIGS. 1 to 3 show one embodiment of the present invention, in which FIG. 1 is a diagram showing the construction of the automatic automobile headlamp leveling device according to the first embodiment of the present invention. FIG. 2 is a flowchart of steps performed by a CPU, which is a control section of the embodiment of FIG. 1. FIG. 3 is a diagram of the characteristics of vehicle speeds and vehicle postures after the vehicle starts to run.

Reference numeral 1 in FIG. 1 denotes a headlamp for an automobile in which a front lens 4 is assembled to a front opening of a lamp body 2 so as to form a lamp chamber S.

In the lamp chamber S, a parabolic reflector 5 having a bulb 6 as a light source is inserted thereinto, and is constructed not only to be supported in such a manner as to be tilted around a horizontal tilting shaft (a shaft perpendicular to the surface of a document on which FIG. 1 is shown) but also to be tilt adjusted by a motor 10 which is an actuator.

The automatic leveling device for the headlamp 1 comprises the motor 10 which is an actuator for tilt adjusting a light axis L of the headlamp 1 in vertical directions, a lighting switch 11 for the headlamp 1, a vehicle speed sensor 12 which is a vehicle speed detection means for detecting the speed of a vehicle, a vehicle height sensor 14 constituting a part of a vehicle pitch angle detection means, a CPU 16 which is a control section for judging: (i) whether the headlamp 1 is turned on or turned off; (ii) judging whether the vehicle is moving or at a stop based on a signal from the vehicle speed sensor 12; (iii) calculating a pitch angle of the vehicle based on a signal from the vehicle height sensor 14; and (iv) outputting a control signal to a motor driver 18 for driving the motor 10 based on pitch angle data so calculated, a storage section 20 for storing pitch angle data of the vehicle which are detected by the vehicle height sensor 14 and calculated by the CPU 16, an interval timer 22 for setting a timing when the motor 10 is driven, a stable running time detection timer 24 for detecting a length of time during which the vehicle is running in a stable fashion, and a turning time detection timer 26 for detecting a length of time during which the vehicle turns.

In the CPU 16, when a signal is inputted thereinto from the vehicle speed sensor 12, whether the vehicle is at a stop or is running is judged based on the input signal from speed sensor 12. When the vehicle is judged to be at a stop, the driving of the actuator 10 is controlled at certain predetermined intervals. When the vehicle is judged to be running, the driving of the actuator 10 is controlled only once when stable running conditions are met.

In addition, in the CPU 16, when a signal is inputted thereinto from the vehicle height sensor 14, a longitudinal tilt (pitch angle) of the vehicle is calculated from this signal, which corresponds to a displacement of the vehicle suspension. For a vehicle described in this embodiment, a single sensor system is adopted in which the vehicle height sensor 14 is provided on a rear right-hand side of the vehicle suspension and, the pitch angle of the vehicle can be estimated from a displacement in vehicle height detected by the vehicle height sensor 14. The CPU 16 then outputs a signal to the motor driver 18 for tilting the light axis L a predetermined amount in a direction in which a detected pitch angle is cancelled.

In addition, the storage section 20 is for storing pitch angle data detected by the vehicle height sensor 14 and calculated by the CPU 16 and every time the latest pitch angle data is inputted into the storage section 20, old data stored in the storage section 20 is rewritten by the latest data inputted. In addition, the latest pitch angle data detected while the vehicle is at a stop is not rewritten, but is held in the storage section 20 after the vehicle starts to run.

The CPU 16 judges whether the lighting switch 11 is turned on or off and outputs a signal to the motor driver 18 for driving the motor 10 only when the lighting switch 11 is turned on.

Furthermore, the CPU 16 outputs a signal to the motor driver 18 for driving the motor 10 only when a predetermined interval time set in the interval timer 22 has elapsed.

The tiltable range of the light axis of the headlamp 1 is predetermined, and therefore, a maximum driving time of the motor 10 required for each leveling operation is also predetermined. When an interval (time) between motor drivings is shorter than the maximum driving time of the motor 10 required for each leveling, the motor 10 is frequently driven to follow changes in the vehicle posture (pitch angle) resulting every time an occupant gets in or out of the vehicle, and therefore the motor 10 is caused to rotate forward or backward or to stop in a repeated fashion before the light axis L (the motor 10) reaches a target position, this leading to the reduction of the life of the motor 10, which is not desirable.

Therefore, a target position for the light axis is constructed so as not to vary during a leveling operation by setting an interval between drivings of the motor longer than the maximum driving time of the motor 10 required for each leveling (for instance, ten (10) seconds).

In addition, although the CPU 16 controls the driving of the motor 10 based on pitch angle data detected by the vehicle speed sensor 12 while the vehicle is at a stop, there may be a case in which a leveling (light axis correction) is carried out based on pitch angle data taken when the vehicle is stopped in an inappropriate state, such as when the vehicle is stopped on an inclined road or a slope, or the vehicle is parked on a curb. To cope with these situations, erroneous leveling (light axis correction) is constructed so as to be corrected by controlling the driving of the actuator 10 based on pitch angle data detected only when the vehicle is running in a stable fashion. Moreover, if the pitch angle data detected when the vehicle is at a stop is appropriate (if the vehicle's stopped state is not an unnatural state in which the vehicle is stopped on a slope or rides on a curb for a stop), the pitch angle data while running substantially equals pitch angle data at a stop. Therefore, the position of the light axis after the leveling has been carried out based on the pitch angle data while running is substantially identical to that of the light axis resulting after the last leveling that has been carried out when the vehicle was at a stop.

In detecting a signal from the vehicle sensor 14, the CPU 16 performs calculations at a relatively fast sampling time when the vehicle is at a stop. When it is running, the CPU 16 is constructed to perform calculations for a pitch angle of the vehicle only on condition that the vehicle speed is equal to or greater than a reference value, the acceleration is equal to or smaller than a reference value, and this state (a state in which the vehicle speed is equal to or greater than a reference value, and the acceleration is equal to or smaller than a reference value) continues over a certain length of time.

In other words, when driving on a rough road where there are a number of factors leading to disturbances such as irregularities on the road surface, it is appropriate to prevent a running at a speed of 30 km/h or faster, and in order to avoid a drastic acceleration or deceleration in which the vehicle posture is changed, it is also appropriate to limit the acceleration to 0.8 m/s$^2$. Therefore, when driving at 30 km/h or faster, and acceleration is 0.8 m/s$^2$ or smaller, and continuation of these two conditions occur for 3 seconds or longer it is determined as stable running conditions. Furthermore, only when the above stable running condition are met, a pitch angle of the vehicle is allowed to be calculated, thereby making it difficult to detect an abrupt abnormal value and to difficult to be affected by such a value should it be detected.

Whether or not this stable running state continues for three seconds or longer is judged by counting the stable running time detection timer 24 by the CPU when a judgement is made on the stable running state.

The CPU 16 judges that an inappropriate leveling state (a vehicle turning state) is present if, for instance, pitch angle data differs from the pitch angle data detected while the vehicle was at a stop, by a predetermined value (0.2 degrees toward a plus side or 0.2 degrees toward a minus side) or greater continues, for instance, two seconds or longer. Once the inappropriate leveling state is detected, the CPU 16 stops the controlling of the driving of the actuator 10 even if the stable running conditions (the driving of 30 km/h or faster, the acceleration of 0.8 m/s$^2$ or smaller, and continuation of these two conditions for 3 seconds or longer) are met.

In addition, whether or not the turning state continues two seconds or longer is judged by counting the turning time detection timer 26 by the CPU 16.

Next, following the flowchart shown in FIG. 2, the control of the driving of the motor 10 by the CPU 16, which is the control unit, will be described below.

First, in Step 98, whether or not the headlamps are turned on is judged by a signal from the lighting switch 11. If YES (the headlamps are being turned on), the flowchart advances to Step 100. In Step 100, whether the vehicle is at a stop or not is judged by a signal from the vehicle speed sensor 12. If YES (the vehicle is being at a stop), in Step 102, pitch angle θ1 is calculated, and then stored in the storage section 20. In a case where pitch angle data is already stored in the storage section 20, the data is rewritten with the new data and stored.

Next, the flowchart advances to Step 104, the interval timer 22 is counted, and in Step 106, whether or not an interval time (for example, ten seconds) has elapsed, is judged. In Step 106, if NO (ten seconds has not elapsed), the flowchart moves back to Step 98, while if YES (ten seconds has elapsed), in Step 107, the interval timer 22 is reset. Furthermore, in a case where a flag is set to indicate that a correction has been carried out, the flat indicating that a correction has been made is reset. In other words, where the control (correction of the light axis) of the actuator has been completed based on the pitch angle data detected while the vehicle is running, although in Step 119 a correction completed flag is to be set as will be described later, in this step 107, this correction completed flag is reset. Next, the flowchart moves to Step 108, where an output is sent to the motor driver 18 in order to drive the motor 10 based on the pitch angle θ1 detected while the vehicle is stopped (step 102), and the flowchart moves back to Step 98.

On the other hand, in Step 100, if NO (the vehicle is running), in Step 110, whether or not the correction completed flag is set (whether or not the light axis has been corrected or a light axis leveling has been carried out while the vehicle is running) is judged. In a case where there has been no flag set, i.e., flag is reset, (in a case where there has been no light axis correction or no leveling has been made while the vehicle is running), in Step 112, whether or not the vehicle speed exceeds a vehicle speed reference value (for example, 30 km/h) is judged, and if YES (the vehicle speeds is over 30 Km/h), in Step 114, then, whether or not the acceleration is smaller than the acceleration reference value (for example, 0.8 m/s$^2$) is judged. In Step 114, if YES (less than 0.8 m/s$^2$), in Step 115, the stable running detection timer 24 is counted. In Step 116, a state in which the vehicle speed exceeds 30 k/m, and the acceleration is less than 0.8 m/s$^2$ continues for the predetermined length of time (for example, three seconds) is judged.

In Step 116, if YES (this state has continued for three seconds or longer), the flowchart moves to Step 118, where pitch angle data θ2 detected by the vehicle height sensor 14 during the stable running is calculated. Next, in Step 119, a correction completed flag is set and the flowchart moves back to step 108, where an output is sent to the motor driver 18 for driving the motor 10 based on the pitch angle data θ2 detected during the stable running, the flowchart then moving back to Step 98.

In Step 110, in a case where the correction completed flag is set, i.e., no correction complete flag reset, (the light axis has been corrected or a leveling has been carried out while running), or if NO (the state in which the vehicle speed exceeds the reference value of 30 km/h and the acceleration is equal to or over 0.8 m/s$^2$), respectively, in Steps 112, 114, the flowchart moves back to Step 98 in any of the cases.

In Step 116, if NO (the state in which the vehicle speed exceeds 30 km/h and the acceleration is less than 0.8 m/s$^2$ does not continue three seconds or longer), the flowchart moves to Step 120, where the pitch angle data detected by the vehicle height sensor 14 while the vehicle is running is calculated, the flowchart then moving to Step 122.

In Step 22, it is judged whether or not the pitch angle data θ3 detected in Step 120 differs from the latest pitch angle data stored in the storage section 20 by the predetermined value (plus/minus 0.2 degrees). If YES (there is a difference of plus/minus 0.2 degrees or greater between the former and the latter), the flowchart moves to Step 123, where the turning time detection timer 26 is counted and the flowchart moves to Step 124. On the contrary, in Step 122, if NO (there is not a difference of plus/minus 0.2 degrees or greater between the former and the latter), the flowchart returns to Step 98. In addition, in Step 124, it is judged whether or not the turning time has continued for two seconds or longer (whether or not the pitch angle data θ3 has been detected continuously for two seconds or longer which differs from the pitch angle data detected while the vehicle is being at a stop by plus/minus 0.2 degrees or greater). At Step 124, if YES (in a case where the CPU 16 recognizes that the vehicle is turning), in Steps 126 and 128, the stable running time detection timer 24 and the turning time detection timer 26 are reset, respectively, the flowchart returning to Step 98. On the contrary, in Step 122, 124, if NO (in a case where the CPU does not recognize that the vehicle is not turning), then the flowchart returns to Step 98.

FIG. 3 shows how the CPU 16 stops controlling the driving of the actuator 10 (stops an automatic headlamp leveling) based on its judgement on the inappropriate leveling state. FIG. 3 shows the characteristics of vehicle speeds and vehicle postures after the vehicle starts to run, wherein reference characters A, B denotes how the vehicle speed and outputs from the vehicle height sensor (vehicle postures) change with lapse of time.

In FIG. 3, after the accelerator pedal is depressed for moving the vehicle, the vehicle speed, in general, increases rapidly and the vehicle moves to a constant speed running condition (refer to reference character A). On the other hand, the vehicle posture changes when the vehicle is affected by acceleration within a time period indicated by T1 required until the vehicle comes to the steady speed running condition after the start thereof. After the vehicle reaches the steady speed running, a certain output can be indicated (refer to reference character B). While the vehicle is at a stop, the driving of the actuator is controlled at certain intervals, and the pitch angle of the vehicle changes due to acceleration acting on the vehicle within the time T1 required to reach the steady speed running condition from the start thereof (refer to reference character B1). When the acceleration is too greater (acceleration of 8 m/s$^2$ or greater) or the vehicle speed is too low (vehicle speed of 30 km/h or slower) the stable running conditions (the driving of 30 km/m or faster, the acceleration of 8 m/s2 or greater, and the former two conditions continue for three seconds) are not met, and therefore there is no possibility that the driving of the actuator is controlled. Then, after the vehicle reaches the constant speed running, the driving of the actuator is controlled only once only when the stable running conditions are met.

However, if the vehicle turns before the stable running conditions are met, and this turning condition continues for a predetermined length of time, an output from the vehicle height sensor 14 (vehicle posture) deviates from the reference value (the pitch angle data θ1 detected when the vehicle is at a stop plus/minus Δθ), as indicated by reference character B2. When this output deviating from the reference value continues for a predetermined length of time (two seconds or longer), the CPU 16 judges the state as the turning state and stops the control of the driving of the actuator (refer to P1 position shown in FIG. 3).

Thereafter, the vehicle turning state stops, and if the stable running conditions (the driving of 30 km/h or faster, the acceleration of 8 m/s² or smaller, and the continuation of the former and latter conditions continue for three seconds) are met (refer to T3 in FIG. 3), the driving of the actuator 10 is controlled based on the pitch angle data detected during the stable running provided that control of the driving of the actuator 10 has not been carried out while the vehicle has been running) (refer to position P2 in FIG. 3).

Figure 4:
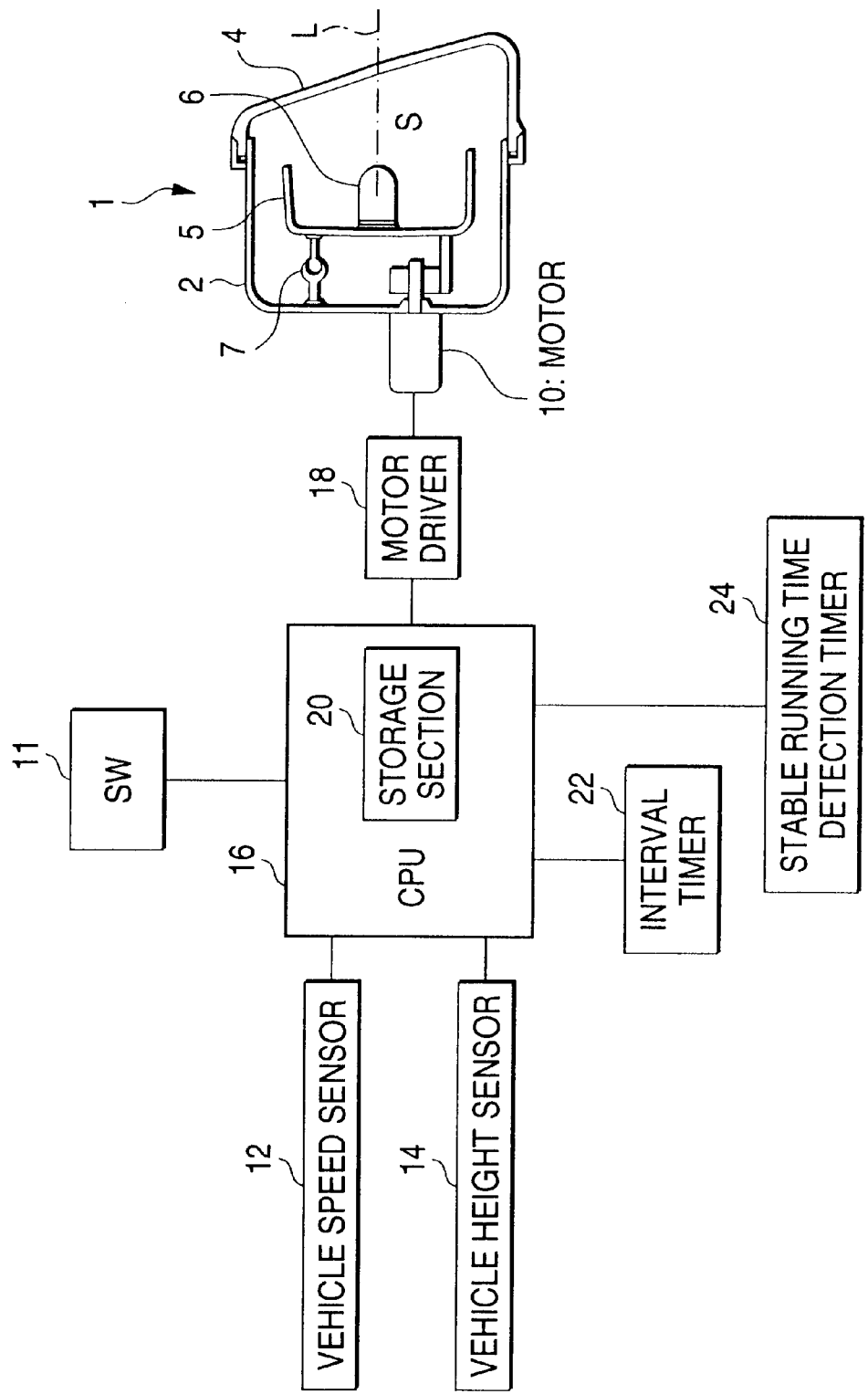
FIG. 4 illustrates the overall construction of an automatic automobile headlamp leveling device according to a second embodiment of the present invention.
Figure 5:
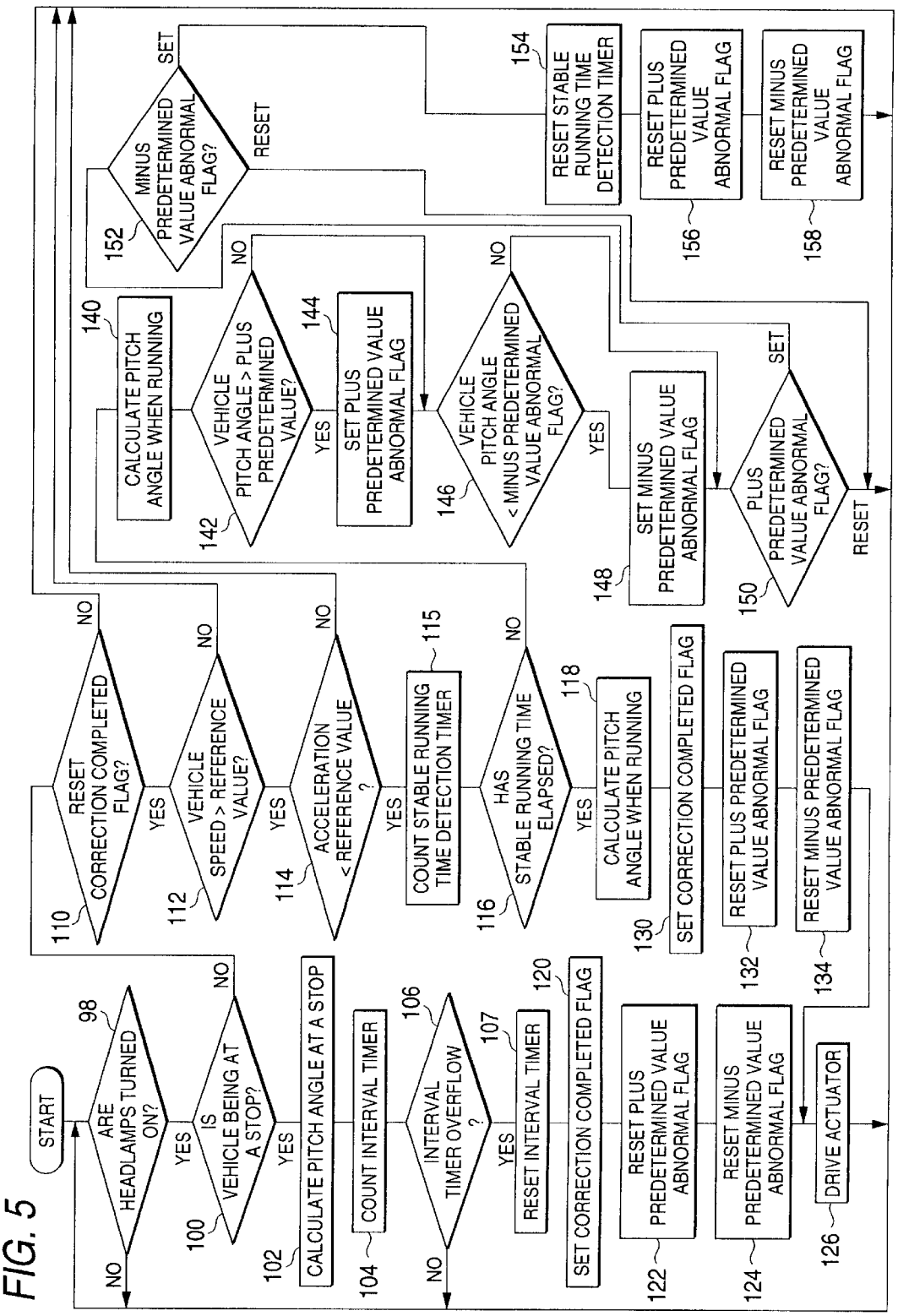
FIG. 5 illustrates a flowchart of a CPU which is a control section of the second embodiment.
Figure 6:
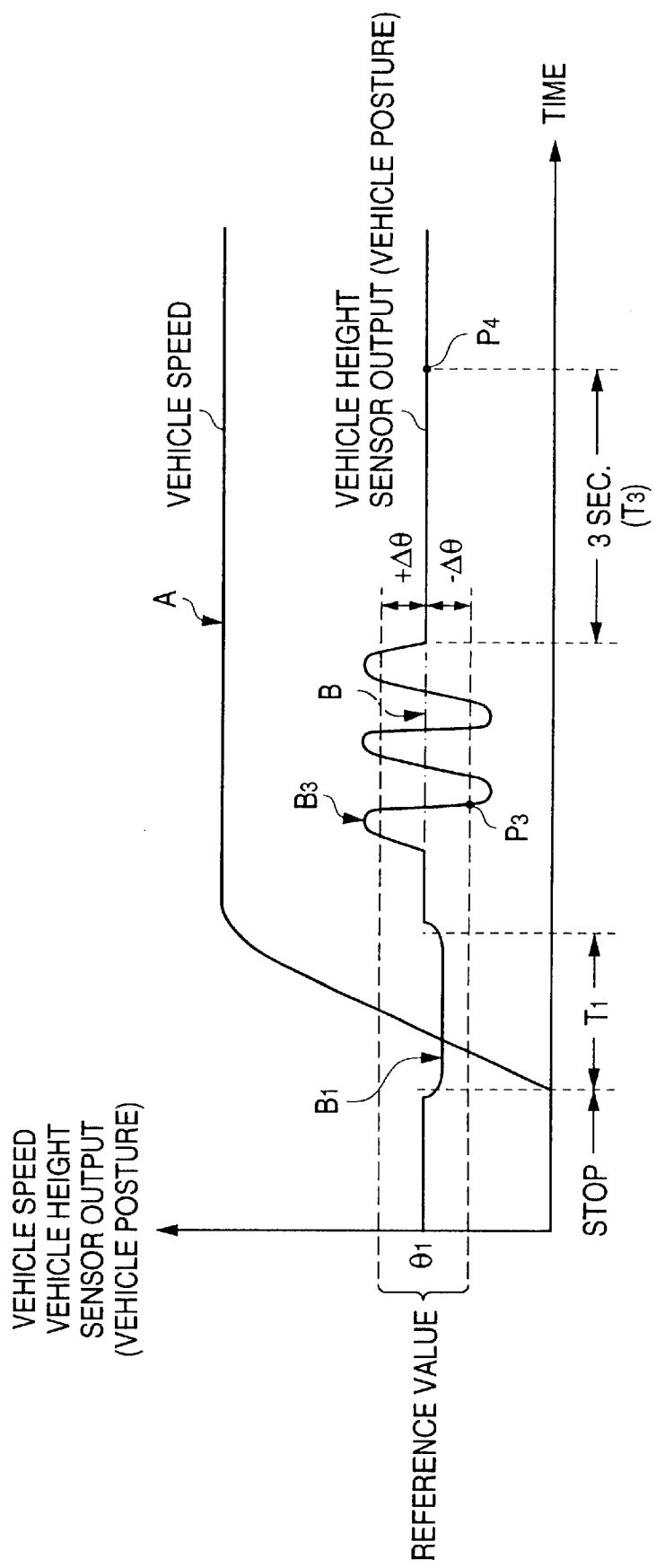
FIG. 6 illustrates the changes in vehicle speed and vehicle posture after the vehicle has started to run.
Figure 7:
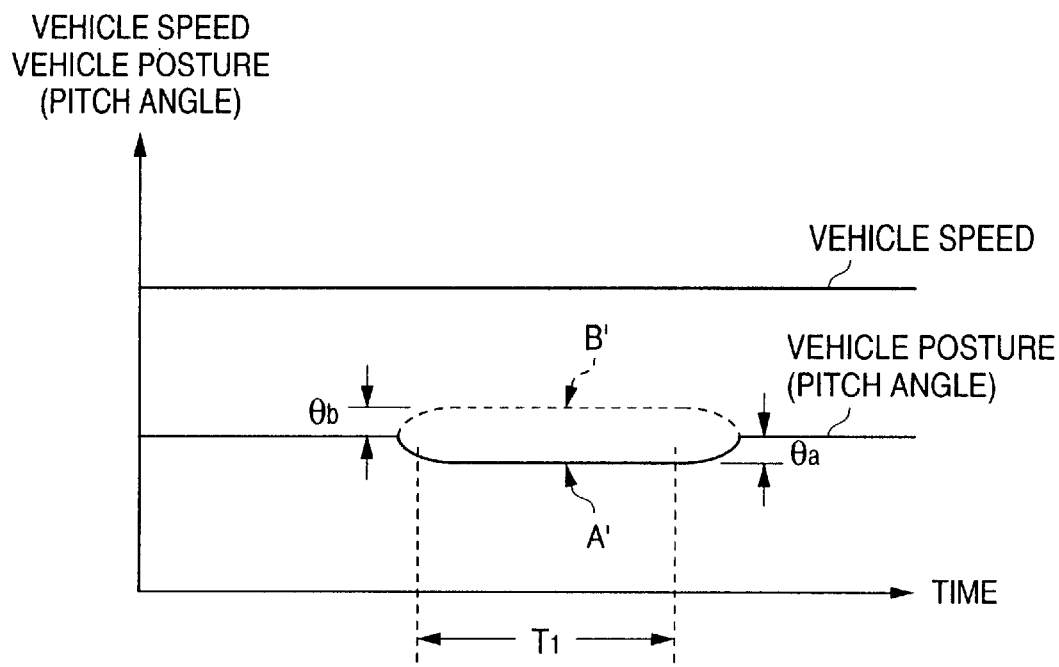
FIG. 7 illustrates the change in vehicle speed and vehicle posture when the vehicle is in a turning state while it is running at a constant speed.
Figure 8:
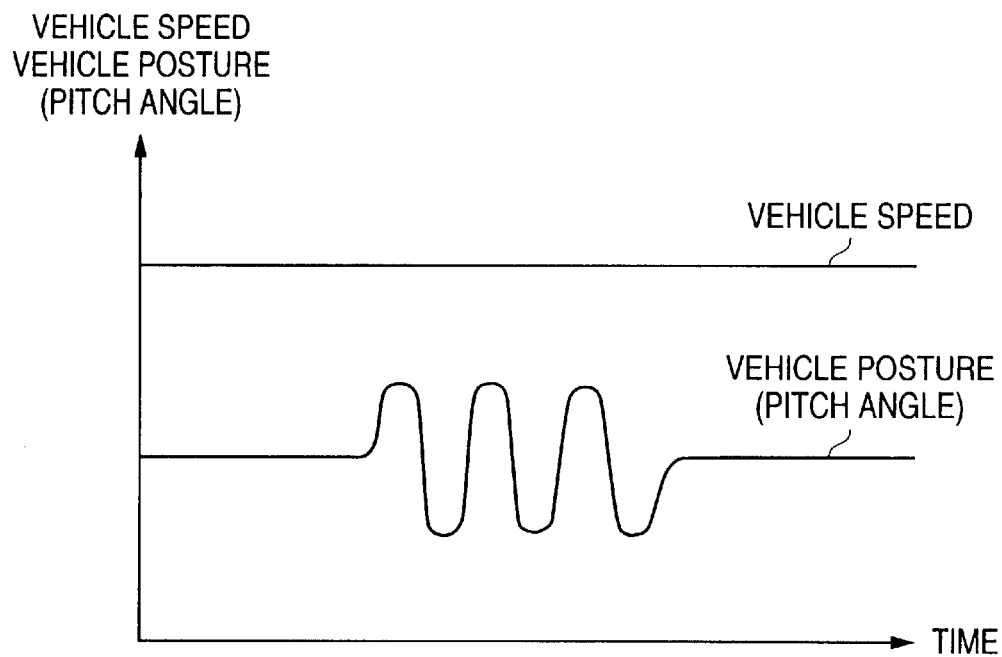
FIG. 8 illustrates the change in vehicle speed and vehicle posture when the vehicle is in a slaloming state while it is running at a constant speed.

FIGS. 4 to 6 show an automatic automobile headlamp leveling device according to a second embodiment of the present invention, and FIG. 4 shows an overall construction of the same leveling device. FIG. 5 shows a flowchart explaining steps taken by the CPU, which is the control section of the same device, and FIG. 6 shows changes in vehicle speed and vehicle posture after the start of the vehicle.

In this embodiment of the automatic headlamp leveling device, the turning time detection timer 26 is not provided as was provided in the first embodiment of the present invention. However, in all other respects, the first and second automatic headlamp leveling devices are identical to each other except that a part of the control method by the CPU 16, which is the control section, is different between the two leveling devices. Therefore, different constructions will be described and descriptions overlapping those made with respect to the first embodiment will be omitted by denoting like potions by like reference numerals or characters.

Namely, in the first embodiment, in a case where pitch angle data θ3 detected while the vehicle is running continues to be detected for, for instance, two seconds or longer during a steady speed running which differs from the reference value (the pitch angle data θ1 detected while the vehicle is being at a stop) by 0.2 degrees or greater toward the plus or minus side, the CPU 16 judges it as an inappropriate leveling state (vehicle turning state) and stops controlling the driving of the actuator 10 so as to avoid the controlling of the driving of the actuator 10 based on the erroneous pitch angle data θ3 or an automatic headlamp leveling under a vehicle turning state. On the other hand, in this second embodiment, in a case where pitch angle data θ3 differing from the reference value by a predetermined value (0.3 degrees) or greater toward the plus and minus side is detected alternately during a constant speed running, the CPU 16 recognizes it as an inappropriate leveling state (slaloming state) and stops controlling the driving of the actuator 10 so as to avoid the controlling of the driving of the actuator 10 based on the erroneous pitch angle data detected during a turning state.

Next, following the flowchart shown in FIG. 5, the control of the driving of the motor 10 by the CPU 16 will be described according to the second embodiment.

Steps 98, 100, 102, 104, 106 and 107 are completely identical to those described with respect to the first embodiment, and therefore descriptions thereof will be omitted by denoting them by like reference numerals.

However, in FIG. 5, in step 120 following Step 107, in a case where a correction completed flag is set, the flag is reset and in Step 122, in a case where a plus side abnormal flag is set, this flag is reset. In Step 124, in a case where a minus side abnormal flag is set, this flag is reset. Then, in Step 126, an output is sent to the motor driver 18 for driving the motor 10 based on the pitch angle data θ1 detected while the vehicle is at a stop, and the flowchart returns to Step 98.

In Step 100, if NO (the vehicle is running), in Step 110, whether or not the correction completed flag is reset (whether or not the light axis has not yet been corrected or a leveling thereof has not been carried out) is judged. If YES (in a case where the correction completed flag has been reset, in other words, the light axis has not yet been corrected while running, or no leveling has not yet been carried out), in Step 112, it is determined whether or not the vehicle speed exceeds the reference value (30 km/h), if YES (the vehicle speed exceeds 30 km/m), in Step 114, whether or not the acceleration is less then the reference value (0.8 m/s²) is judged. In Step 114, if YES (less than 0.8 m/s²), in Step 115, the stable running time detection timer 24 is counted. In Step 116, whether or not a state in which the vehicle speed exceeds 30 km/h and the acceleration is less than 0.8 m/s² continues for a predetermined length of time (three seconds) is judged.

In Step 116, if YES (the aforesaid state continues for three seconds or longer), the flowchart moves to Step 118, where the pitch angle data θ2 detected by the vehicle height sensor 14 during the stable running is calculated. Next, in Step 130, a correction completed flag is set, in Step 132, the plus side abnormal flag is reset, and in Step 134, the minus side abnormal flag is reset. Then, the flowchart moves to Step 126, an output is sent to the motor driver 18 for driving the motor 10 based on the pitch angle data θ2 detected while the vehicle is running stably, the flowchart returning to Step 98.

In Step 110, if NO (the correction completed flag is set, in other words, the light axis has been corrected or a leveling thereof has been carried out while the vehicle is running), and in Steps 112, 114, if NO (the vehicle speed is at the reference value of 30 km/h or slower and the acceleration is at the reference value of 0.8 m/s² or greater), respectively, the flowchart returns to Step 98 in any of these cases.

In Step 116, if NO (the state in which the vehicle speed exceeds the reference value of 30 km/h and the acceleration is less than the reference value of 0.8 m/s² does not continue for three seconds or longer), then the flowchart moves to Step 140, where the pitch angle data θ3 detected by the vehicle height sensor 14 while the vehicle is running is calculated, the flowchart moving to Step 142.

In Step 142, whether or not the pitch angle θ3 data detected when the vehicle is running is greater than a reference value (the latest pitch angle data θ1, detected when the vehicle was at a stop and stored in the storage section 20, plus a predetermined value Δθ (0.3 degrees)). Then in Step 142, if YES, the flowchart moves to Step 144, where a plus side abnormal flag is set, and thereafter the flowchart moves to Step 146. On the contrary, in Step 142, if NO, the flowchart directly moves to Step 146. In Step 146, it is judged whether or not the pitch angle θ3 data detected when the vehicle is running is smaller than a reference value (the latest pitch angle data θ1, detected when the vehicle was at a stop and stored in the storage section 20, less a predetermined value Δθ (0.3 degrees)). Then in Step 146, if YES, the flowchart moves to Step 148, where a minus side abnormal flag is set, and thereafter the flowchart moves to Step 150. On the contrary, in Step 146, if NO, the flowchart directly moves to Step 150.

In Step 150, whether or not the plus side abnormal flag is reset is judged. If YES (reset), the flowchart returns to Step 98. On the contrary, if NO (set), in Step 152, whether or not the minus side abnormal flag is reset is judged. In Step 152, if YES (reset), the flowchart returns to Step 98. On the contrary, in Step 152, if NO (set), in Step 154, the stable running time detection timer 24 is reset, and in Steps 156, 158, the plus side abnormal flag and the minus side abnormal flag are reset, respectively, the flowchart returning to Step 98.

FIG. 6 shows how the CPU 16 stops controlling the driving of the actuator 10 (stops an automatic headlamp leveling) based on its judgment of an inappropriate leveling state. FIG. 6 shows the characteristics of vehicle speeds and vehicle postures after the vehicle starts to run, wherein reference characters A, B denotes how the vehicle speed and outputs from the vehicle height sensor (vehicle postures) change with lapse of time.

FIG. 6 shows a slaloming state while the vehicle is running at a constant speed B3, while FIG. 3 shows a turning state while the vehicle is running as a constant speed B2, and the two embodiments are different in this respect. The characteristics denoted by reference characters A, B in FIG. 6 are completely identical to the characteristics denoted by reference characters A, B in FIG. 3. Also, as to reference characters B1, T1, they are also completely identical to each other. Thus, descriptions of these reference characters are the same as in the first embodiment and hence will be omitted.

As shown in FIG. 6, after the vehicle reaches a constant speed running condition A, if the vehicle slaloms before the stable running conditions are satisfied and this slaloming state continues, and the outputs (vehicle posture) from the vehicle height sensor 14 are greater and smaller than the reference value (the pitch angle data θ1 detected when the vehicle is being at a stop plus/minus Δθ) are repeated alternately, as indicated by reference character B3, the CPU 16 recognizes this state (a state in which outputs greater and smaller than the reference value are repeated alternately) as a slaloming state and stops controlling the driving of the actuator (refer to a position P3 in FIG. 6).

Thereafter, when the slaloming state stops and if the stable running conditions (the driving at the vehicle speed of 30 km/h or faster, the acceleration of 0.8 m/s² or smaller and the continuation of these conditions for three seconds) are met (refer to T3 in FIG. 6), the driving of the actuator 10 is controlled based on the pitch angle data detected while the vehicle is running in a stable fashion, provided that the driving of the actuator 10 has not been previously carried out while the vehicle has been previously running (refer to position P4 in FIG. 6).

In the aforesaid second embodiment, when a state in which the pitch angle data θ3, when running, is alternately greater and less than the reference value continuously, such a condition is recognized as slalom running, but the present invention is not limited thereto.

In addition, the above-described two embodiments, the intervals (time) at which the actuator is driven is described as ten seconds, but the interval is not limited to ten seconds and may be set arbitrarily relative to the maximum driving time of the actuator.

Moreover, in the above embodiments, the stable running conditions are described as constituted by factors such as the driving at a speed of 30 km/h or faster, the acceleration of 0.8 m/s² or smaller and the continuation of these conditions for three seconds, but they are not limited to those factors.

Moreover, in the aforesaid embodiments, the automatic headlamp leveling is described with respect to a movable reflector type headlamp in which the reflector 5 is provided in such a manner as to be tilted relative to the lamp body 2 fixed to the vehicle body, but the present invention may be similarly applied to an automatic headlamp leveling of a movable unit type headlamp in which a lamp body reflector unit is provided in such a manner as to be tilted relative to a lamp housing fixed to the vehicle body.

As is clear from the embodiments described, the driving of the actuator for automatic leveling is limited so as to take place only when the vehicle is at a stop or running in a stable fashion. Moreover, when the vehicle is at a stop, the actuator is driven at certain intervals. Thus, the number of times when the actuator is operated is limited, power can be saved and the wear of the driving mechanism constituent members is also limited. Consequently, it is possible to provide an automatic automobile headlamp leveling device that is inexpensive and which can operate in an accurate fashion.

In addition, the automatic headlamp leveling is avoided under such vehicle running conditions as turning and slaloming which are easily mistaken for the stable running condition, whereby it is possible to perform an accurate automatic headlamp leveling based on accurate pitch angle data detected while the vehicle is running stably. Accordingly, an erroneous leveling performed while the vehicle is at a stop can be corrected when the vehicle is running stably, whereby the safety can be secured for both the driver of the subject vehicle and drivers of oncoming vehicles.

According to the present invention, when the inappropriate leveling state, resulting when the vehicle is turning or slaloming is eliminated, if no headlamp leveling has been performed from the start of the vehicle, the actuator is controlled so as to be driven based on the pitch angle data detected while the vehicle is running stably so that an appropriate automatic headlamp leveling can be performed only once.

Additionally, the actuator can be constructed so as not to be driven until the headlamps are turned on. This provides for an accurate and inexpensive automobile headlamp leveling device because the number of times when the actuator is operated, electric power consumption, and wear of the driving mechanism constituent members is reduced.

Furthermore, according to the present invention, the frequency at which the actuator is driven is low, whereby it is possible to provide an automatic automobile headlamp leveling device that can operate long time in an accurate fashion.

It is contemplated that numerous modifications may be made to the automatic automobile headlamp leveling device of the present invention without departing from the spirit and scope of the invention as defined in the following claims.

What is claimed is:

1. An automatic automobile headlamp leveling device comprising:

headlamps each adapted to be driven by an actuator such that a light axis thereof is tilted up or down relative to a vehicle body;

control means for controlling the driving of said actuators;

vehicle speed detection means for detecting the speed of a vehicle;

a storage section for storing pitch angle data detected by said pitch angle detection means, said control means controlling the driving of said actuators based on detected pitch angle data such that the light axes of said headlamps are maintained in a position relative to the surface of a road, wherein said control means judges whether the vehicle is stopped or running based on outputs from said vehicle speed detection means and said control means controls the driving of said actuators at predetermined intervals when the vehicle is stopped, and when the vehicle is running, said control means controls the driving of said actuators only once when it is determined the vehicle is running stable, and wherein said control means determines an inappropriate leveling state as calculated from pitch angle data of the moving vehicle and then stops controlling the driving of said actuators.

2. An automatic automobile headlamp leveling device as set forth in claim 1, wherein said inappropriate leveling state is a vehicle turning state in which running pitch angle data differs from stopped pitch angle data by a predetermined value for a predetermined length of time.

3. An automatic automobile headlamp leveling device as set forth in claim 1, wherein said inappropriate leveling state is a vehicle slaloming state in which detected running pitch angle data is alternately greater and smaller than stopped pitch angle data by a predetermined value.

4. An automatic automobile headlamp leveling device as set forth in claim 1, wherein said control means controls the driving of said actuators based on pitch angle data taken when the vehicle is running in a stable fashion when said control means judges that stable running conditions are met, after said control means had previously made a judgement on inappropriate leveling state and stopped controlling the driving of said actuators.

5. An automatic automobile headlamp leveling device as set forth in claim 1, wherein controlling of said actuator is performed provided that said headlamps are turned on.

6. An automatic automobile headlamp leveling device as set forth in claim 1, wherein said predetermined intervals are set so as to be longer than a maximum driving time of said actuator required for each leveling operation.

7. An automatic automobile headlamp leveling device comprising:

a vehicle speed detection unit outputting detected speed information;

a vehicle height detector outputting vehicle height information;

a timing unit operative to track time of specified vehicle conditions and outputting said timing information;

a driving/motor mechanism operative to adjust said headlamp such that a light axis thereof may be movably controlled to a desired position; and a control section operative to receive said detected speed information, height information and timing information, said control section processing the received information to output control signals to said driving/motor mechanism such that said light axis achieves said desired position, wherein said control signals are provided at predetermined intervals when the vehicle is stopped, and when said vehicle is moving, said control signals are provided only once when said control section determines that the vehicle is in a stable running state, and wherein said control signals are not provided when said control section determines that the vehicle is in an inappropriate leveling state as calculated from pitch angle data of the moving vehicle.

8. The automatic headlamp leveling device according to claim 7, wherein said predetermined intervals are set to be longer than a maximum driving time required to adjust said headlamps to each desired position.

9. The automatic headlamp leveling device according to claim 8, wherein said inappropriate leveling state is a vehicle turning state determined when said control section calculates pitch angle data of the moving vehicle, that differs from stored pitch angle data by a predetermined reference value, said stored pitch angle data measured and stored when the vehicle was stopped, and such condition continues for a predetermined period of time.

10. The automatic headlamp leveling device according to claim 8, wherein said inappropriate leveling state is a vehicle slaloming state determined when said control section calculates pitch angle data of the moving vehicle to alternately be greater and smaller, by a predetermined value, than stored pitch angle data which was stored and measured when the vehicle was stopped.

* * * * *